(12) United States Patent
Turner et al.

(10) Patent No.: US 12,473,695 B2
(45) Date of Patent: Nov. 18, 2025

(54) SYSTEM AND METHOD FOR FORMING A MOULDED ARTICLE

(71) Applicant: Diageo Great Britain Limited, London (GB)

(72) Inventors: Adam Richard Turner, Toft (GB); Natasha Wilson, Toft (GB); Joshua Lanzon-Miller, Toft (GB); Jonathan Morris, Toft (GB); Anthony Robin Burness, Toft (GB); Andrew William Norfolk, Toft (GB); Benjamin Rhys Williams, Toft (GB); Amy Joanne King, Toft (GB); Rupert Anthony Barton, Toft (GB); Paul Clifford Smith, Toft (GB)

(73) Assignee: Diageo Great Britain Limited, London (GB)

( * ) Notice: Subject to any disclaimer, the term of this patent is extended or adjusted under 35 U.S.C. 154(b) by 208 days.

(21) Appl. No.: 18/033,406

(22) PCT Filed: Nov. 4, 2021

(86) PCT No.: PCT/GB2021/052863
§ 371 (c)(1),
(2) Date: Apr. 24, 2023

(87) PCT Pub. No.: WO2022/096887
PCT Pub. Date: May 12, 2022

(65) Prior Publication Data
US 2023/0357992 A1 Nov. 9, 2023

(30) Foreign Application Priority Data
Nov. 4, 2020 (GB) .................................... 2017432

(51) Int. Cl.
*D21J 7/00* (2006.01)
*B29C 33/38* (2006.01)

(52) U.S. Cl.
CPC ............ *D21J 7/00* (2013.01); *B29C 33/3814* (2013.01)

(58) Field of Classification Search
CPC ..................................... D21J 7/00; D21J 3/10
See application file for complete search history.

(56) References Cited

U.S. PATENT DOCUMENTS

| 3,235,455 A | 2/1966 | Judge et al. | |
|---|---|---|---|
| 2004/0041305 A1* | 3/2004 | Tsuura | D21J 7/00 425/116 |

(Continued)

FOREIGN PATENT DOCUMENTS

| EP | 1081285 | 3/2001 |
|---|---|---|
| EP | 1104822 | 6/2001 |

(Continued)

OTHER PUBLICATIONS

UKIPO Examination Reports for corresponding priority application, May 5, 2021.
IPRP/ISR, May 8, 2023.

*Primary Examiner* — John J DeRusso
(74) *Attorney, Agent, or Firm* — Scherrer Patent & Trademark Law, P.C.; Stephen T. Scherrer; Monique A. Morneault

(57) ABSTRACT

A system and method of producing a moulded article, e.g. a one-piece container, comprises delivering a fibre suspension to a porous mould and removing a suspending liquid (e.g. water) via pores of the porous mould. An inflatable bladder is inserted into the mould in a collapsed state and then inflated to apply pressure to internal walls of the article to remove water content. A wet embryonic form of the container is then transferred to a non-porous mould where an (Continued)

inflatable bladder applies internal pressure to compress the walls and remove further water content. The container is further dried by microwave and/or air drying and may be coated with a protective layer.

21 Claims, 4 Drawing Sheets

(56) References Cited

U.S. PATENT DOCUMENTS

| | | | |
|---|---|---|---|
| 2013/0020277 | A1 | 1/2013 | Berk et al. |
| 2018/0086511 | A1 | 3/2018 | Lin |
| 2019/0169800 | A1* | 6/2019 | Hardacre ................ D21F 5/167 |

FOREIGN PATENT DOCUMENTS

| | | |
|---|---|---|
| EP | 1195466 | 1/2002 |
| EP | 1221413 | 7/2002 |
| EP | 2198088 | 7/2019 |
| EP | 3708709 | 9/2020 |
| GB | 326305 | 3/1930 |
| GB | 2416143 | 1/2006 |
| JP | 2007292304 | 11/2007 |
| WO | 2009034344 | 3/2009 |
| WO | 2015051107 | 4/2015 |
| WO | 2018020219 | 2/2018 |
| WO | 2021142505 | 7/2021 |

\* cited by examiner

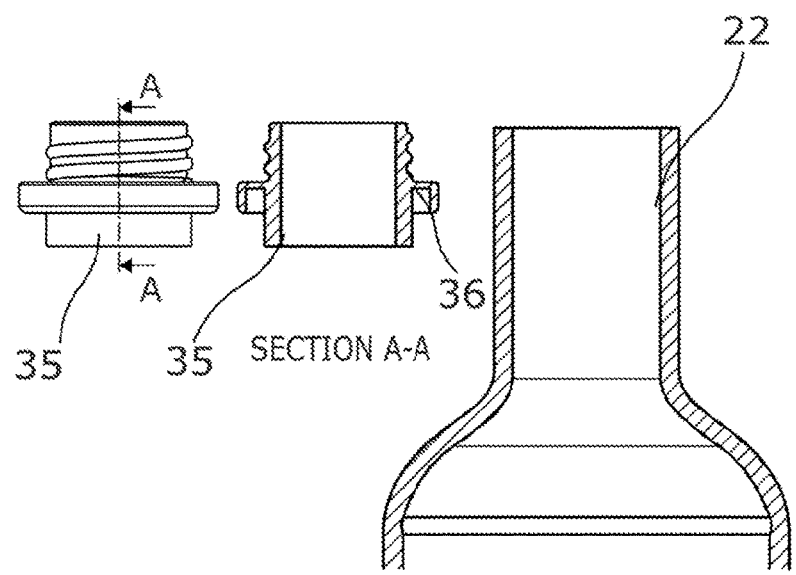
Fig. 4
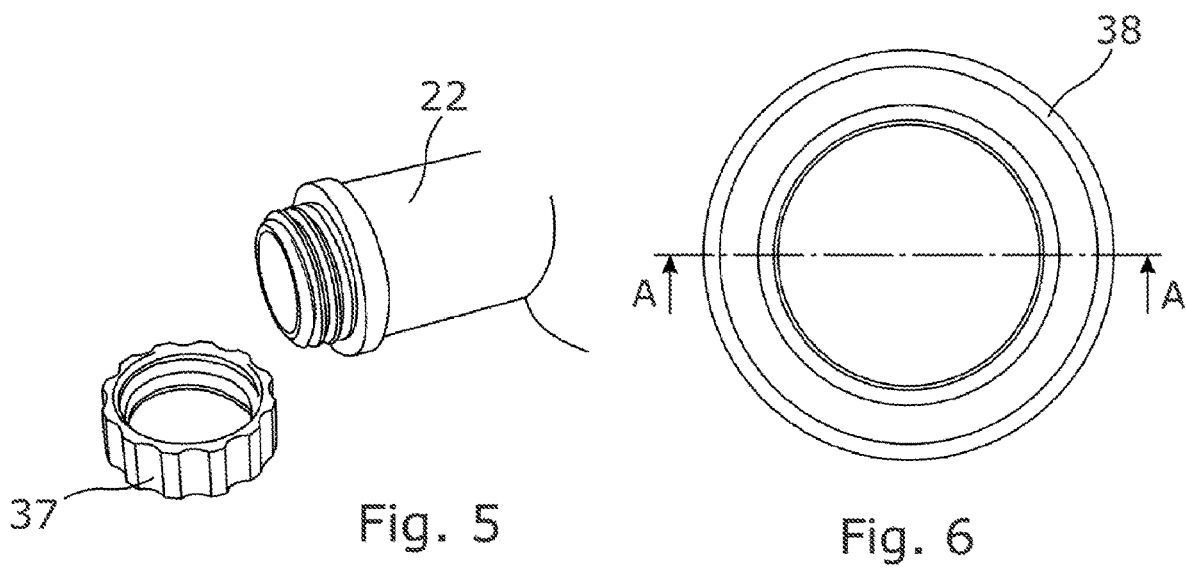
Fig. 5
Fig. 6

SYSTEM AND METHOD FOR FORMING A MOULDED ARTICLE

TECHNICAL FIELD

The present invention relates to a system and method for forming a moulded article. Particularly, the invention is concerned with forming containers from a fibre suspension, e.g. paper pulp. The articles/containers may be a consumer packaging useful for holding liquids.

BACKGROUND TO THE INVENTION

It is desirable to reduce plastics use in consumable items, particularly packaging. Trays and simple shapes are commonly made from paper pulp, but more complex objects and those required to hold liquids are more difficult to engineer.

Published patent documents EP1081285A1, EP1195466A1, EP2198088A1 and WO2018020219A1 each describe forming an article from paper pulp in a mould. The mould has openings through it or is porous such that a suspending liquid introduced to the mould, with which the pulp is mixed, can be removed by applying suction. The pulp left behind after the liquid is removed conforms to the shape of mould. In a second step an inflatable member in a collapsed state is introduced into the mould and inflated to apply pressure against the internal walls of the article being formed, thereby distributing pulp to a more uniform wall thickness and expelling further suspending liquid from the article and mould. The formed article is released from the mould and dried to remove remaining liquid.

SUMMARY OF THE INVENTION

The present invention is concerned with an evolution of the above-described technology to improve the specifications of the resultant article being formed or at least provide the public with an alternative. The invention is particularly suited to producing closable bottles for holding liquids such as cleaning products and beverages.

In a broad aspect implementing the invention a method is defined according to claim 1. Other useful method steps and features are outlined in dependent claims.

It is envisaged that the invention will ultimately produce an improved pulp bottle construction, made in one piece. Accordingly, a novel bottle obtainable by the process is within the scope of the invention. The article being produced by the process is a 3D hollowed out form such as a cup, bottle or jar; as opposed to a primarily shallow shape like a plate.

In a particular form, the method of the invention includes preparing a fibre suspension in a suspending liquid. Preparation may involve a pulp property refiner such as a valley beater and a tank for hydrating with a shear or paddle mixer. This step may be done continuously with the process or in batches. A concentrated form of the suspension may be prepared for dilution just prior to moulding. The concentration most effective for delivery to the mould is approximately 0.5 to 1% fibre.

While continuously fed to a closed two-part porous mould (e.g. configured with a negative 3D image of the desired moulded article, such as a bottle) to a predetermined volume, the suspending liquid is removed via pores of the porous mould, e.g. by vacuum pressure/pump. The predetermined volume may be monitored by weighing suspending liquid removed from the mould. By way of example, 10 Litres of process water may have been collected in a tank outside the porous mould, leaving behind the pulp fibres on the mould surface.

In one form of the system, after substantially all suspending liquid is removed, an impermeable surface (e.g. an inflatable bladder in a collapsed state) is inserted into the wet moulded article to apply pressure to internal walls of the article (e.g. by inflation with pneumatic or hydraulic pressure; air, water or oil) and thereby expel further suspending liquid through pores of the porous mould. The moulded article may then be removed for further drying steps.

According to the invention, the moulded article is also subjected to a non-porous mould, e.g. transferred to a second or further mould that is non-porous. Accordingly, pressure may be further applied to internal walls of the article, such as via an impermeable surface (e.g. either the same inflatable bladder, a second bladder or some other form of pressing means—whether strictly "impermeable" or not), in order to impart the shape of the non-porous mould to external walls of the article. Such a step is preferably heated to "thermoform" and drive out remaining suspending liquid and strengthen walls of the moulded article by compression and drying.

The walls of the porous mould are preferably cleaned after removal of the article, e.g. by reversing expelled suspending liquid back through the mould and/or use of a water jet against walls of the mould. Cleaning removes residual fibres from the porous surface and re-conditions the mould for repeated use.

A drying stage of the method/system may utilise microwave energy, e.g. in a continuous or batch delivery system. The article may be dried at a stage either before or after the non-porous mould, or both.

A coating stage may apply a protective layer to a surface of the moulded article. For example, the coating step may comprise spraying a base and sides of the moulded article internally and/or externally. The coating may be a non-heatsealable aqueous barrier, capable of being recycled with the bottle after use.

A closure element may be applied to an opening of the moulded article (e.g. after coating/drying). The closure element may include a neck fitment with an annular feature to seal against the opening. In one form the neck fitment comprises a foil seal, cork and/or cap.

The invention may be embodied by a system for forming a moulded article, comprising: a source of fibre suspension in a suspending liquid; a delivery line to deliver the fibre suspension to a first, porous, mould; a suction pump for removing the suspending liquid via pores of the porous mould; optionally, an inflatable pressing member may be inserted into the mould in a collapsed state and then inflated to apply pressure to internal walls of the article. A means for subjecting the moulded article to a non-porous mould is provided. The non-porous mould is likely a second or further mould but could in principle be the first mould converted to a second, non-porous, state. Pressure is applied, at the non-porous mould, to internal walls of the article, e.g. via the inflatable pressing member or a second inflatable pressing member. A transport means is provided to remove the moulded article from the mould.

A container according to the invention is moulded from a fibre suspension and comprises: a substantially one piece/unitary construction; a neck fitment or a moulded thread at a mouth of the neck.

In one form there may be provided a neck fitment for a container made from a fibre suspension including: a tubular body; and a substantially continuous flange about a surface of the tubular body for bonding and/or abutting against an opening of the container made from a fibre suspension. The tubular body may be cylindrical and the flange annular. There may be a thread or receiving thread formed on a surface of the body. A cap or plug for serving as a closure to an opening of the tubular body may be provided.

BRIEF DESCRIPTION OF THE DRAWINGS

FIG. 4 illustrates a section view of a bottle opening and fitment;

FIG. 5 illustrates a pictorial view of the fitment from FIG. 4;

FIG. 6 illustrates an alternative view of a bottle opening fitment; and

DETAILED DESCRIPTION OF THE INVENTION

The following description presents an exemplary embodiment and, together with the drawings, serves to explain principles of the invention. However, the scope of the invention is not intended to be limited to the precise details of the embodiments or exact adherence with all steps, since variations will be apparent to a skilled person and are deemed also to be covered by the description. Terms for components used herein should be given a broad interpretation that also encompasses equivalent functions and features. In some cases, several alternative terms (synonyms) for structural features have been provided but such terms are not intended to be exhaustive.

Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner. Directional terms such as "vertical", "horizontal", "up", "down", "upper" and "lower" are used for convenience of explanation usually with reference to the illustrations and are not intended to be ultimately limiting if an equivalent function can be achieved with an alternative dimension and/or direction.

The description herein refers to embodiments with particular combinations of steps or features, however, it is envisaged that further combinations and cross-combinations of compatible steps or features between embodiments will be possible. Indeed, isolated features may function independently as an invention from other features and not necessarily require implementation as a complete combination.

Figure 1:
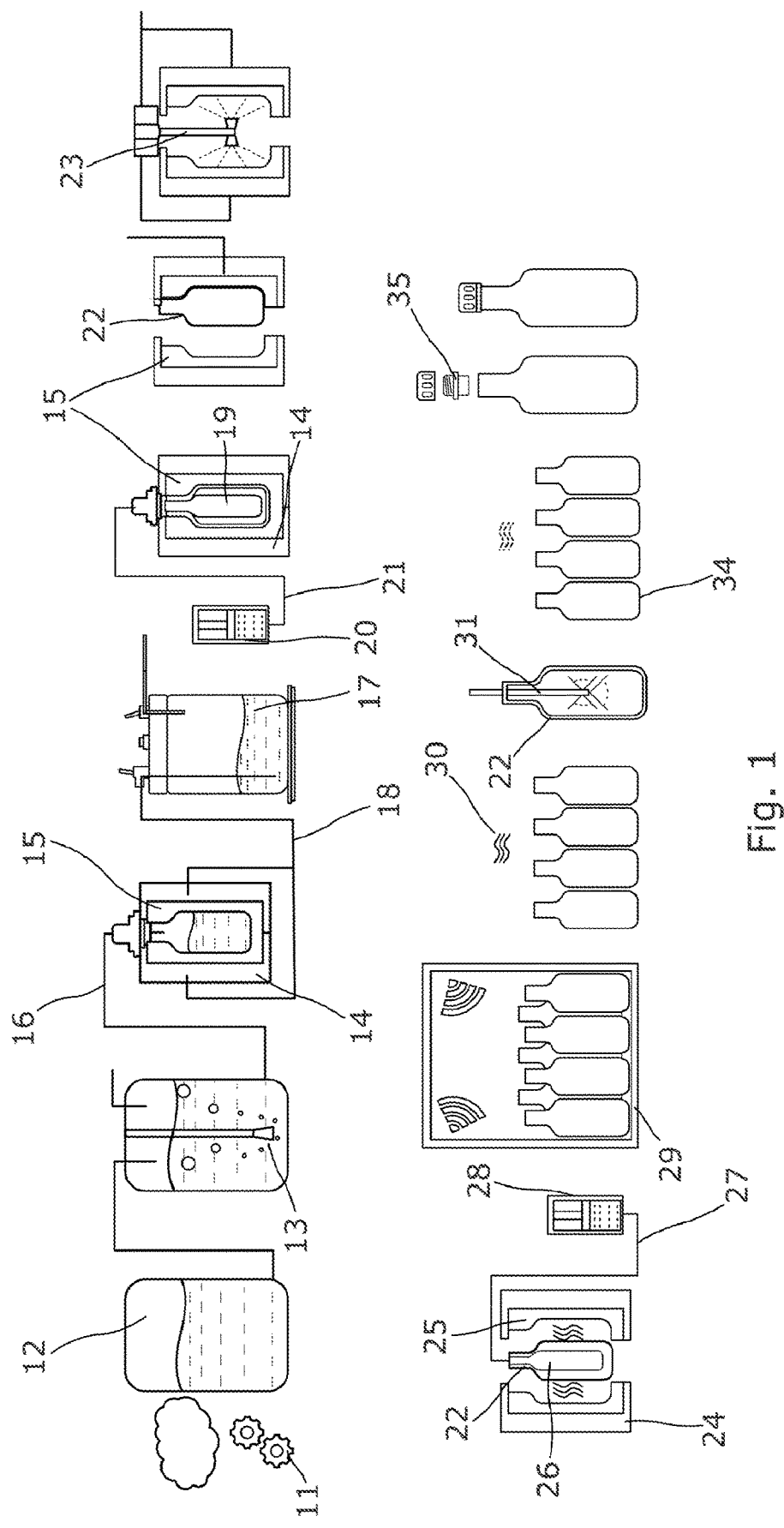
FIG. 1 illustrates a system/process implementing a method according to the invention.

FIG. 1 outlines an example of a process incorporating the invention, namely comprising the steps of preparing a pulp suspension, introducing this to a porous mould, expelling a suspending liquid therefrom to produce an unfinished moulded article and subjecting the unfinished article to a non-porous mould. The article may be subsequently, or at an intermediate stage, dried with or without an internal protective coating. More detail of an embodiment is described below.

At a first stage of pulp processing and storage raw pulp fibres are delivered in sheets directly from a supplier, rehydrated and passed between plates of a valley beater 11, in relative motion to each other. One of the things that happens during refining of fibres is fibrillation, i.e. the partial delamination of the cell wall, resulting in a hairy appearance of the wetted fibre surfaces. The resultant "hairs", also called fibrillations, increase the relative strength of the bond between fibres in the dry product.

During this process desired additives are used to change the structure, strength and moulding properties of the bottle and potentially reduce cost. Sizing, fillers and buffer additives can be evaluated as required.

A concentrated form of the processed pulp can be stored in a vat 12 until required, which reduces the total amount of storage space.

Dilution, e.g. 0.5 to 5% solid fibre of a water based suspension, is carried out at a mixing station 13 just prior to moulding. Mixing at this step ensures the slurry is homogenised without changing the characteristics of the pulp. As shown, bubbles rise to the top, displacing the slurry above them and pulling the bottom level liquids upwards.

The initial moulding step 14 features a porous mould, e.g. a 3D printed tool 15 where two halves are clamped together using hydraulic rams. In the illustrated form of the invention, slurry is top-filled into tool 15, by contrast to moulding processes that dip a mould in slurry. The pulp slurry is thereafter drawn via line 16 under a vacuum through porous tool 15, similar to an injection moulding machine. Shot mass may be controlled by measuring (e.g. weighing) the mass/ volume of water being drawn into the tank 17. Once the required mass is reached, the tool is opened to ambient air. A weight scale platform supporting tank 17 is visible in FIG. 1.

The suspending liquid drawn with the fibre suspension in line 16 is water. Water drawn under vacuum through line 18 into tank 17 is substantially free of fibres since these are left behind against the walls of porous tool 15. By way of example, suction of suspending liquid 18 through mould 15 is continuous until a predetermined volume (e.g. 10 litres) of water has been collected in tank 17.

The "article" within tool 15 is, at this stage, a formed but wet shape held against the internal walls of the mould.

In one form, in order to remove further suspending liquid (water) and consolidate the 3D article shape, an impermeable inflation element, e.g. collapsible bladder 19, is inserted into mould 15 to act as an internal high-pressure core structure for the tool. As mentioned, this process strengthens the wet 'embryo' bottle so that it can be handled (or transported by mechanised means) before drying and displaces water in-between the cellulose fibres, thereby increasing the efficiency of the drying process. The bladder 19 is actuated/regulated using a hydraulic pump 20 with a cylinder that displaces a fluid in line 21 into bladder 19 to expand it radially and to conform to the tool cavity. Fluid within line 21 is preferably non-compressible such as water. Water also has the advantage that any leaking or bursting of the bladder will not introduce a new substance to the system (since the suspending liquid is already water).

In one form positive hydraulic pressure from tank 17 can be used to oppose the force from the internal bladder after moulding has taken place.

Figure 2:
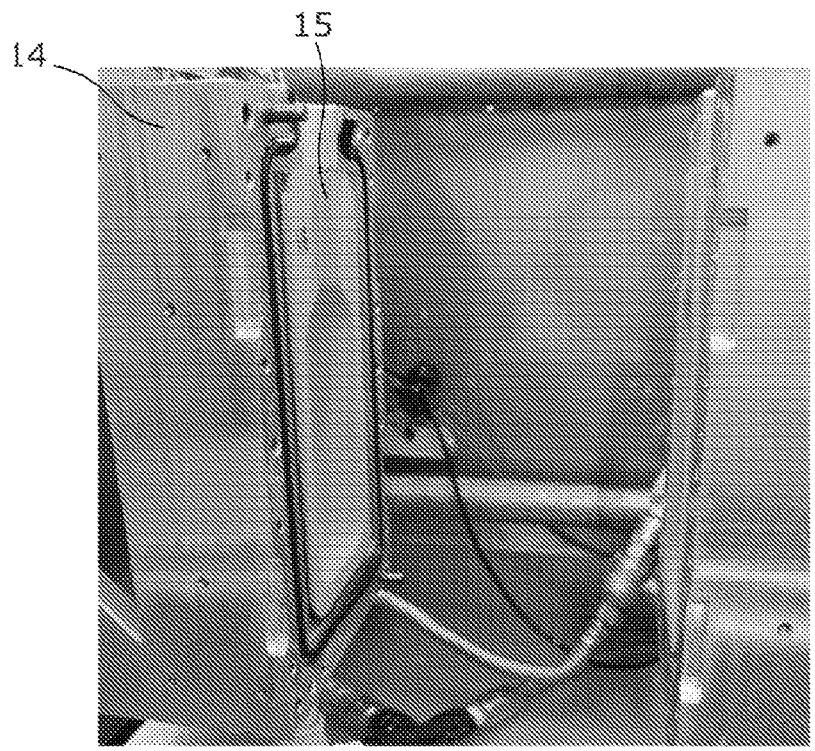
FIG. 2 illustrates a 3D porous mould according to the invention.
Figure 3:
FIG. 3 illustrates a moulded article as it is removed from the 3D porous mould.

FIGS. 2 and 3 show, pictorially, the appearance of a two-part block 14 that houses a porous mould 15 (non-porous mould 25 would have a similar appearance as described further below). Channels through block 14 communicate with the porous mould 15 to provide a path for suspending liquid drawn through the mould, and also reverse flow during the cleaning step (described below).

Demoulding occurs at the step (and shown in FIG. 4) where mould tool 15 opens for removal of a self-supporting article 22. A cleaning step 23 is preferably performed subsequently to remove small fibres and maintain tool porosity. In the illustrated form, a high-pressure jet firing radially is inserted into the moulding chamber while the tool is open. This dislodges fibres on the surface. Alternatively, or in addition, water from tank 17 is pressurised through the back of the tool 15 to dislodge entrapped fibres. Water is drained for recycling back to an upstream step of the system. It is noteworthy that cleaning is an important step for conditioning the tool for re-use. The tool may appear visibly clean after removal of the article, but its performance will be compromised without a cleaning step.

According to FIG. 1, the formed but unfinished article 22 is subsequently transported to a second or further moulding step 24 where, in a non-porous, e.g. aluminium, tool 25 pressure and/or heat is applied for thermoforming a desired neck and surface finish. After the two halves of tool 25 (optionally including negative surface features for debossing/embossing, etc.) have closed around article 22 a pressurising means is engaged, e.g. a second bladder 26 (or the same bladder 19 as earlier in the process) inserted into article 22. Bladder 26 is inflated via line 27 by a pump 28 with a heater to supply pressurised fluid, e.g. water or oil. The external mould 24 block and tool 25 may also, or alternatively, be heated.

The state of moulded article 22, after thermoforming, is considerably more rigid, with more compressed side walls, compared to the state at demoulding from the porous mould 15.

In the illustrated form a microwave stage 29 is used as a fast and efficient method of drying that does not damage the bottles. By way of example, a 25 kW microwave processing a 100 g bottle with 200 g of water can dry 1M/year; 1.8 kW of microwave power is applied per bottle for 7 minutes—using 740 kJ. The system scales linearly with microwave power and water mass. Alternative drying systems are possible for incorporation with the method of the invention.

An improved extraction system will further improve drying speed and can be optimised for different bottle shapes.

A drying stage 29 (microwave or otherwise) can be applied downstream of non-porous moulding, as shown, or upstream thereof as a pre-moulding step. However, moulding in non-porous mould 25 requires some water content in order to assist with bonding during the compression process. In some forms, microwave or other drying options may be applied at multiple stages of the process.

FIG. 1 illustrates a further drying stage 30, that may utilise hot air circulated onto the bottles, e.g. in a "hot box", prior to a coating stage where, for example, a spray lance 31 inserted into bottle 22 applies a surface coating to internal walls thereof. In practice, the coating provides a protective layer to prevent egress of liquid contents into the bottle wall which may permeate and/or weaken it. Coatings will be selected dependent on the intended contents of bottle 22, e.g. a beverage, detergent, etc.

A curing method at step 34 can be optimised dependent on the coating, e.g. drying for twenty-four hours at ambient conditions or by a flash drying method.

At an appropriate stage of production (e.g. during thermoforming, before or after coating) a closure or mouth forming process may be performed on the article.

FIGS. 4 and 5 illustrate a first form of neck fitment 35, wherein a tubular body may be glued onto the paper bottles 22 to provide a seal therewith. An annular channel 36 in the body provides an abutment surface to receive and hide an edge of the bottle mouth.

FIG. 5 shows a cap 37 provided for coupling to fitment 35 by an annular thread. However, the closure design can be tailored to specific needs of the end-use requirements.

Figure 7:
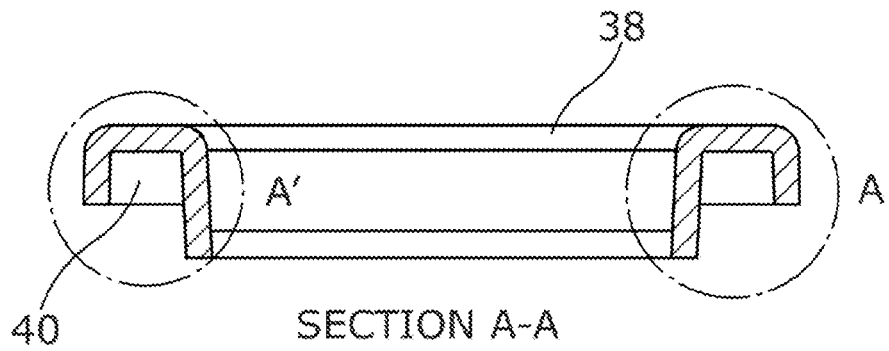
FIG. 7 illustrates section views of the bottle opening structure from FIG. 6.
Figure 7:
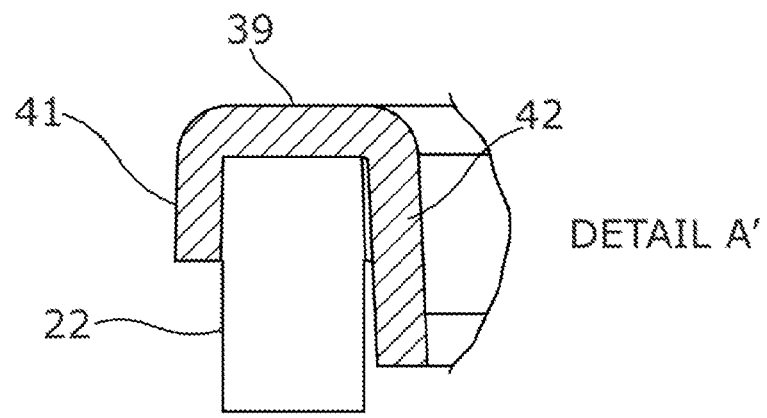
Figure 7:
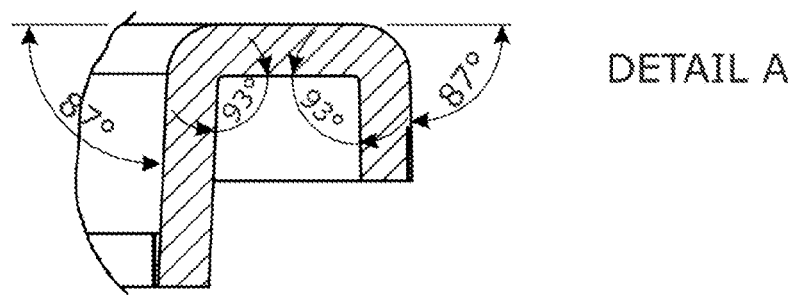

An alternative embodiment of closure/opening is illustrated by FIGS. 6 and 7, specifically exemplified by a ring structure 38 that may be formed from pulp fibre in a separate compression moulding process. The ring serves as a finishing step for the mouth of a bottle 22, preferably providing a flat surface 39 onto which a heat-sealed film can be applied.

In the illustrated form, ring 38 includes an annular channel 40 for receiving an unfinished open edge of the bottle 22. Channel 40 is comprised of an upstanding external wall 41 and an upstanding internal wall 42, that are bridged by flat/sealing surface 39. A draw angle may be incorporated into the walls for ease of manufacture (e.g. by compression moulding of pulp) but is not essential for operation.

Pulp fibre is the preferred material of manufacture for ring 38, in keeping with the generally plastic-free construction of the moulded article as a whole, however other materials are possible for its construction.

Ring 38 is preferably glued or otherwise fixedly attached to article 22 to form a liquid and gas tight join. Likewise, any circular foil or other seal structure applied to surface 39 should be adhered in a gas tight manner. Achieving a gas impermeable construction may require a surface coating over all or part of ring 38, e.g. at least over surface 39 which must also be free of imperfections that affect sealing with a separate seal material (not shown).

For recyclability it is possible to leave a portion of the ring uncoated so that the pulp is fluid-accessible during the recycling process; e.g. to break down the fibres.

Ring 38 represents a pulp-based finishing solution for the opening of article 22. Alternative structures are possible.

A gas impermeable seal/membrane applied to an opening of an article is advantageous, not only for single use volumes of liquid (such as single serve beverages) but also larger volumes that can be decanted to another container (e.g. a refillable detergent pumpable container or a glass spirit decanter) or attached directly to a dispense means (e.g. a pump or optic associated with an upturned bottle).

By way of summary, in one form the invention can be described as a system and method of producing a moulded article, e.g. a one-piece container, comprises delivering a fibre suspension to a porous mould and removing a suspending liquid (e.g. water) via pores of the porous mould. An inflatable bladder is inserted into the mould in a collapsed state and then inflated to apply pressure to internal walls of the article to remove water content. A wet embryonic form of the container is then transferred to a non-porous mould where an inflatable bladder applies internal pressure to compress the walls and remove further water content. The container is further dried by microwave and/or air drying and may be coated with a protective layer.

The invention claimed is:
1. A method of forming a moulded article comprising:
preparing a fibre suspension in a suspending liquid;
feeding the fibre suspension to a porous mould;
removing the suspending liquid via pores of the porous mould to form the moulded article;

transferring the moulded article to a non-porous mould;
applying pressure to internal walls of the moulded article to press external walls of the moulded article against the non-porous mould; and
removing the moulded article from the non-porous mould.

2. The method of claim 1, wherein removal of suspending liquid via pores of the porous mould includes applying pressure to internal walls of the moulded article via an impermeable surface.

3. The method of claim 2, wherein the impermeable surface is the same for use in the porous and non-porous mould.

4. The method of claim 1, wherein applying pressure to internal walls of the moulded article at the non-porous mould is achieved via an impermeable surface, in order to impart the shape of the non-porous mould to external walls of the moulded article.

5. The method of claim 4, wherein an inflatable pressing member comprises the impermeable surface, that is inserted into the mould in a collapsed state and then inflated to apply pressure to internal walls of the article.

6. The method of claim 5, wherein the inflatable member is inflatable by water or oil.

7. The method of claim 4, wherein the impermeable surface is the same for use in the porous and non-porous mould.

8. The method of claim 1, wherein the moulded article is subjected to heating in the non-porous mould.

9. The method of claim 1, comprising cleaning walls of the porous mould after removal of the article.

10. The method of claim 9, wherein cleaning comprises reversing expelled suspending liquid back through the mould and/or use of a water jet against walls of the mould.

11. The method of claim 1, wherein preparation of the fibre suspension includes use of a valley beater.

12. The method of claim 1, wherein at least one of:
the fibre suspension fed to the porous mould comprises 0.5 to 3% solids; or
the fibre suspension is stored in a concentrated form, prior to dilution for feeding to the porous mould.

13. The method of claim 1, including a drying step for the moulded article, wherein the drying step utilises at least one of:
microwave energy either before or after the non-porous mould, or both;
hot air; or
cold air.

14. The method of claim 1, comprising a step for coating a surface of the moulded article.

15. The method of claim 14, wherein the coating step comprises spraying an internal base and sides of the moulded article.

16. The method of claim 1, comprising applying a closure element to an opening of the moulded article.

17. The method of claim 16, wherein the closure element includes a ring or neck fitment with an annular feature to seal against the opening.

18. The method of claim 17, wherein the ring or neck fitment is comprised of pulp fibre.

19. The method of claim 1, wherein the porous mould is a two-part mould for forming a substantially closed 3D unitary shape.

20. The method of claim 1, wherein the article is a bottle shape with a body portion wider than a neck portion.

21. A system for forming a moulded article, comprising:
a source of fibre suspension in a suspending liquid;
a porous mould;
a non-porous mould;
a delivery means to deliver the fibre suspension to a first, the porous mould;
a suction pump for removing the suspending liquid via pores of the porous mould to form the moulded article;
a means for applying pressure to internal walls of the article, against the non-porous mould, following transfer of the moulded article from the porous mould to the non-porous mould.

* * * * *